US009862391B2

(12) United States Patent
Zamorano Morfín

(10) Patent No.: US 9,862,391 B2
(45) Date of Patent: Jan. 9, 2018

(54) PERSONALISED ELEVATED URBAN TRANSPORT

(71) Applicant: Luis Rodolfo Zamorano Morfín, Mexico City (MX)

(72) Inventor: Luis Rodolfo Zamorano Morfín, Mexico City (MX)

( * ) Notice: Subject to any disclaimer, the term of this patent is extended or adjusted under 35 U.S.C. 154(b) by 0 days.

(21) Appl. No.: 14/897,960

(22) PCT Filed: Dec. 16, 2014

(86) PCT No.: PCT/MX2014/000206
§ 371 (c)(1),
(2) Date: Dec. 11, 2015

(87) PCT Pub. No.: WO2015/093931
PCT Pub. Date: Jun. 25, 2015

(65) Prior Publication Data
US 2016/0280238 A1  Sep. 29, 2016

(30) Foreign Application Priority Data

Dec. 18, 2013 (MX) .................... MX/a/2013/015095
Dec. 5, 2014 (AR) ............................ P20140104553

(51) Int. Cl.
*B61B 3/00* (2006.01)
*B61B 3/02* (2006.01)
(Continued)

(52) U.S. Cl.
CPC ................. *B61B 3/02* (2013.01); *B61B 1/00* (2013.01); *B61B 1/02* (2013.01); *B61D 17/041* (2013.01); *B61L 27/04* (2013.01); *Y02T 30/30* (2013.01)

(58) Field of Classification Search
CPC .. E01B 25/22; B61B 1/00; B61B 1/02; B61B 3/00; B61B 3/02; B61D 7/041; B61L 27/04
See application file for complete search history.

(56) References Cited

U.S. PATENT DOCUMENTS 3,890,904 A * 6/1975 Edwards ................... B61B 5/02
104/118
7,246,559 B2 * 7/2007 Stromberg ................ B61B 3/02
104/124
(Continued)

*Primary Examiner* — Jason C Smith
(74) *Attorney, Agent, or Firm* — Sterne, Kessler, Goldstein & Fox P.L.L.C.

(57) ABSTRACT

A bidirectional overhead urban transport (TUEP) for a large transportation capacity, which is suspended over a series of poles, without interfering with the traffic of vehicles and pedestrians surface, which is characterized by having a continuum of autonomous cabins circulating about a tubular track suspended by static wires hanging from the poles. The system has overhead stations for passengers, by which access is given to the suspended cabins, moved by autonomous and independent electric motors which rotate a drive pulley rolling on the upper back of a horizontal tubular track raised or inclined according to the topography of the ground. The peculiarity of this transport system is that each of the cabins that are only for two passengers, travels directly to a destination station, where is diverted from the main flow to a station, so it is not necessary to stop the main flow of cabins, which results in that although circulating at low to moderate speed, the time required to travel is reduced.

11 Claims, 19 Drawing Sheets

(51) Int. Cl.
    *B61B 1/00*     (2006.01)
    *B61B 1/02*     (2006.01)
    *B61D 17/04*     (2006.01)
    *B61L 27/04*     (2006.01)

(56) References Cited

U.S. PATENT DOCUMENTS

| | | | |
|---|---|---|---|
| 8,066,200 B2 * | 11/2011 | Hepner | E01B 25/08 104/118 |
| 2004/0112245 A1 * | 6/2004 | Cortazar | B61B 3/00 104/28 |
| 2007/0017410 A1 * | 1/2007 | Guenther | E01B 25/22 104/14 |
| 2016/0009297 A1 * | 1/2016 | Duran Ariza | B61B 13/04 104/23.1 |
| 2016/0280238 A1 * | 9/2016 | Zamorano Morfín | B61B 1/00 |
| 2016/0288802 A1 * | 10/2016 | Kinugawa | B61B 3/02 |
| 2016/0332523 A1 * | 11/2016 | Wada | B60L 5/005 |
| 2016/0347330 A1 * | 12/2016 | Jacob | B61B 5/00 |
| 2017/0002523 A1 * | 1/2017 | Ogisu | E01B 11/42 |
| 2017/0043792 A1 * | 2/2017 | Schertler | B61B 7/00 |
| 2017/0050646 A1 * | 2/2017 | Blengini | B61B 7/06 |

\* cited by examiner

PERSONALISED ELEVATED URBAN TRANSPORT

BACKGROUND OF THE INVENTION

Field of the Invention

The present invention refers to horizontal passenger transport in city environments, where large numbers of people feel the need to mobilize to study, work, enjoy, etc. on routes used on a daily basis and whose demand is growing due to the increase of urban population which has already saturated other routes.

Previous Art

The evolution of cities has been changing mobilization, needs by virtue of the distances to travel, the time required therefor, security and comfort, so throughout the years use has been made of equine animals, carts, bicycles, cars, trams, buses, subway, motorcycles, ski lifts, cable cars and helicopters.

The customized overhead urban transport (TUEP) as Proposed is an alternative System for continuously and massively transporting passengers to be adopted by cities using a not congested space.

Although there already are other types of transport in cabins such as ski lifts, which aim to provide a mountain railway generally consisting of two cabins linked by a cable and running on a rail, and which makes a cabin go up while the other moves down; cable cars consisting of cabins or chairs that are supported and pulled by a steel cable stretched between two huge pulleys that are driven by electric motors and speed, reducers; there also exist monorails, which are devices widely used in the manufacturing industry, and which carry loads or may be cabins on a rail and are pulled by special chains with bearings driven by motorized sprockets.

Both ski lifts and cable cars transport cabins from an origin to a destination, and monorails do so to stations in series. In all three cases the entire load is strictly positioned in series and any stop or movement affects the whole load.

Objects of the Invention

The main object of the present invention is to propose a new system for massive passenger transportation in cities that takes advantage of an uncongested urban space such as streets and avenues, by cars, trucks, trains and trams, cyclists, pedestrians, etc., and meets the objectives of security, speed, capacity, economy, comfort, and sustainability.

A further object of the present invention is to provide a passenger transport having adequate capacity to solve or mitigate the growing urban mobility needs of people, so its flow should be sufficient to ensure that it is used as mass public transport.

Another object of the present invention is to achieve a transportation means that is safe, though not infallible, so it can be used by unskilled persons of all ages and conditions.

A further object is to propose a rapid transport, so that users find competitive advantages over traditional transports.

A further objective will be to achieve a transport that does not pollute the atmosphere and does not produce noise pollution or affects the aesthetics of cities.

Another object will be to achieve a transport that is economical in its areas of investment, operation and maintenance.

A further object will be to achieve a transport that is friendly, and comfortable in use, to be widely accepted by users.

Finally, a further object will be to achieve a transport system that is sustainable to be accepted by society in the short, medium and long term.

SUMMARY OF THE INVENTION

According to the new invention, the innovations that characterize it are indicated as follows:

There are several structural ways to support the Passenger cabins through an overhead tubular track.

A.—The preferred embodiment is:

a) a triangular section metallic structure comprising two lower and one upper horizontal tubes, connected together by evenly spaced inclined struts and diagonal metal straps providing greater rigidity to the structural system. Said composite structure acts as girder between support gaps and is elevated above the ground or roads in cities, so that the transport system gets installed at a safe height from traffic vehicles, trees and other obstacles of certain height in cities;

b) besides serving as a structural girder, the lower metal tubes serve as bidirectional track for the passenger cabins to travel along the back thereof, thus offering a continuous track, with sufficient rigidity and unobstructed on one side, that connects to the different stations of the transportation system and able to withstand its own weight, plus the weight of the cabins and passengers, the dynamic load, wind load and the load of any earthquakes that may occur. This triangular section of tubes and studs is raised above the natural ground of floor by structural columns and towers, so that the whole system represents the infrastructure of the transport system of the present Customized Overhead Urban Transport.

B.—One embodiment of the infrastructure mentioned above, which can be used especially in very long path gaps is as follows:

a) a system characterized by being an overhead transport consisting properly grounded tail poles that support two separate static steel cables that support through hanging hooks an horizontal tubular tracts on which the passenger cabins shall run. Each cable corresponds to a direction sense of the system, i.e., it is bidirectional. The steel cables are supported by a triangular metal structure transverse thereto which is positioned on top of the poles and which through suspension-type terminals hold the steel cables, thus forming catenaries in the spaces between poles. The cables are capable of supporting their own weight, tensile strengths, plus the weight of the tubular track, plus the weight of the cabins and passengers, plus the dynamic loads of movement, wind, earthquake and in some cases snow loads.

b) the vertical hanging hooks are hung from the static steel cables in a spaced relation, which are intended to support the tubular track. The top of the hooks is of the clamp type that securely tightens the steel wires and connects with a vertical straight section which may be adjustable in length to be adapt on the top to the shape of the catenary and an the bottom to a horizontal position to be the tubular track. The hook shape corresponds to the need to support the tubular track on the bottom without hindering the passage of the drive pulley and the cabins engines. Likewise, the hooks serve as support of the bare electric wire that will supply power to the trolley supplying electrical power to each of the cabins.

C.—The tubular track can be made of steel or other material either metal or heavy plastic on which the passenger cabins will run. At the top of the track is a stabilizer bar which can be rectangular or triangular or have the shape of a rail, whose function is to maintain the verticality of the cabins when the load to be transported is not properly balanced with regard to the application of weight or when cross wind occurs that can destabilize the cabins and cause discomfort to passengers. This bar keeps the rotation of the drive pulleys on a vertical reference line by an evenly shaped groove in the pulleys.

D.—Autonomous cabins for two or maximum three passengers, preferably hanging from the tubular track. Said cabins are autonomous as regards their motion and are composed of a closed receptacle, a structural hanging part, one or two drive pulleys and one or two electric motors. The drive pulleys rotate on the upper back of the tubular track and have a shape or profile that precisely conforms to the circumference of the tube. The inside of the pulleys is covered with a rubber or elastomer that provides the necessary friction to prevent the pulley from slipping on the tubular track in its yaw movement. The pulleys are equipped with anti-friction members such as packed bearings or dry or lubricated bushings. All this is contained by structural elements from which the vertical supports of the cabins are connected. Also from these structural elements is supported the engine or autonomous electric motors of each cabin, which firmly connects by its rotating shaft with the drive pulley, causing it to roll over the tubular track.

E.—The elements that provide movement of the cabins are electric motors connected to the pulleys directly or by speed reducers, according to need. The motors can use direct or alternating current with variable speed, but trying to have a perfect synchronization between, the cabins to achieve a movement that maintains a constant distance between them. For those routes where the slope inclination demands, there may be two motors coupled in series. Electrical power for the motors is supplied by bare wires routed as catenary, which makes contact with a trolley-like retractable arm, which is based on the engine or contacts through electrical brushes the drivers that are attached to the stabilizer bar or pendants supporting the cabins. And backup batteries for emergency operations.

F.—The autonomous hanging cabinets can be made of light materials such as aluminum with regard to their structural part, in combination with the lifting front side or with side hinged doors that may also be made of aluminum, fiberglass or carbon fiber. The passenger seats should also be lightweight and are supported by the structural part of the cabin. The front side, which has doors that open onto the front or can be rotatably lifted, allows entry and exit of passengers as a gate and thus avoids the discomfort represented by the side doors wherein passengers should pass in front of another seated passenger. The lift gates are equipped with systems of springs, hydraulic or gas dampers and locks similar to those used on the rear lift gates of cars. They are also equipped with sensors to ensure that the cabins do not move with the partially or fully open door and thus prevent accidents. The cabins with hinged side doors are an entirely feasible alternative, which simultaneously open with a lateral outer mechanism and do not require the springs and dampers described above.

G. For passenger access to TUEP, the system has stations, where the cabins are momentarily stopped, front or side doors open and passenger boarding and get off are achieved. The system has three types of stations, depending on the necessity of the case: i) the terminal stations are those where the TUEP travel begins and ends; ii) the longitudinal intermediate stations which are parallel to the tubular track and iii) intermediate stations transverse to the direction of the tubular track. Intermediate stations are those that are installed at predetermined distances and serve as origin and destination of passengers that need not go to a terminal station. The longitudinal type stations parallel to the tubular track and the transversal type stations have the same operational features, but with a different architectural layout. All types of stations are elevated to the TUEP's track level, so that while being accessed by passenger escalators or elevators, the movement of vehicles and pedestrians at street level without interruption is also allowed.

H.—Only cabins destined to a particular intermediate station shall be diverted from the main tubular track described above, allowing the flow of cabins not heading to said destination to continue their journey without interruption, thus saving transfer time and energy in starts and stops. The diversion of the cabins is achieved through early detection which will be described later and by the actuation of diverters which in this case are horizontally flexible tubular tracks enabling by forming an arc that the continuity of the track is given to stations or to the driving mainline. The diverters are equipped with electric or hydraulic or pneumatic actuators, which ensure accurate and rapid operation upon demand of the automation system commands. Similar diverters will be installed to allow cabins then entering to the main flow of the TUEP system, to continue the journey.

I.—The tubular track at the stations has a U-shape, more or less extended as the case of each station may be J.—The power supply to the engines at the stations is independent of engine power to the girder track, to allow cabins to travel at other truly low speeds and have their braking and detection area for ascent and descent of the passengers, without having to affect the main flow of cabins in the TUEP tubular track.

K.—The stations are equipped with cabin stability and braking systems in passenger ascent and descent areas, such that boarding is in optimal conditions, avoiding longitudinal and transverse movements that may be annoying to the user. Likewise, the stations have mechanisms to rotate cabins 90°, so that they have a single front for the ascent and descent of the passengers and the security conditions of not having to cross the line of movement of the cabins is preserved.

L.—The TUEP complete system is controlled by a central master automation system and a particular automation system for each cabin, of the SCADA (Supervisory Control and Data Acquisition) type, which identities through wired and wireless sensors the position of each cabin and the destination thereof, so it can be promptly diverted to each of the stations and then reinserting them to the TUEP's main system. There are commercially available WI-FI (wireless communication) systems of open protocols such as PROFIBUS or PROFINET that can be adapted to this particular use, of which I will not make further description as they already available on the market but surely require a specific characterization and programming. Each cabin is equipped with a keypad where the ascending user shall set a destination station, which shall be recorded in a buffer or a WIFI-like destination programming trigger in each boarding area for passengers at stations. Said destination is transmitted via a WiFi antenna to a receiving antenna at the diverters in each station to let the cabin pass without deviation or taking it to the intermediate reference station through the diverter. Once the diverters act they return to the normal upright position of the TUEP track. The control system is responsible for making the continuous monitoring of the cabins, as well as maintain speeds, acceleration, deceleration, braking, distance between cabins, destinations, diversions of cabins to stations and reintegrating them to the central flow and security systems.

M.—In order to maintain a safe, operable and communicated passenger transportation system, the system has a fiber optic subsystem with a centralized controller that keeps autopilot, signaling, ticketing system, voice and data communication system, video system and a power supply and control switchable system.

N.—A system of power distribution along the TUEP and its stations, consisting of distribution substations distributed properly to avoid voltage drop in the driving line, as well as supplying power to control stations and their enlightenment. Also, the whole TUEP is protected by a network of conventional grounds and arresters which is mounted on the poles supporting the static cables.

BRIEF DESCRIPTION OF THE DESCRIPTION

Figure 8:
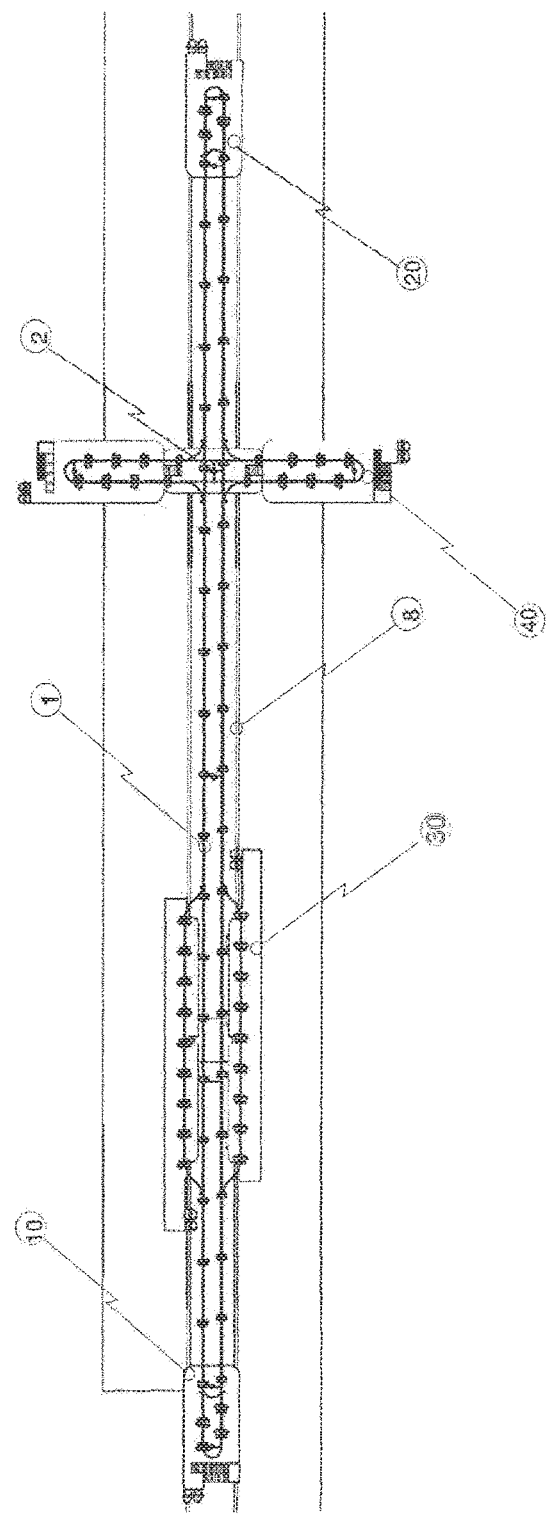
Figure 9:
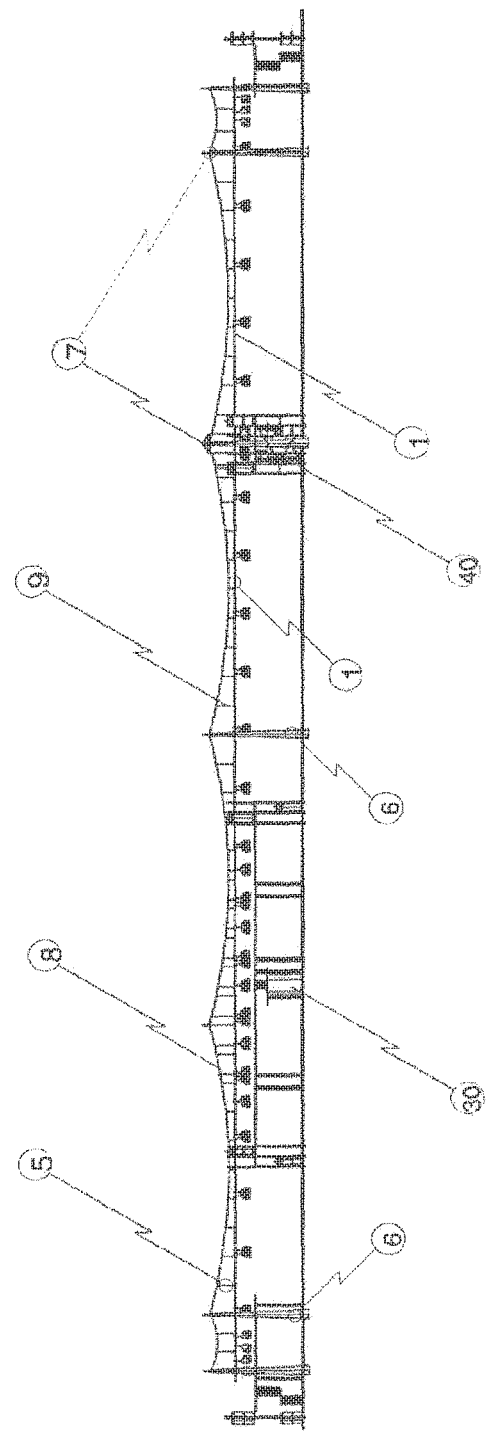

FIG. 8 shows a plan view of a TUEP in its alternative embodiment, with terminal, stations and two intermediate Stations. The straight lengths of the route section are not shown due to the drawing FIG. 9 shows an elevation view of a TUEP in its alternative embodiment, with terminal stations and two intermediate stations. The straight lengths of the route section are not shown due to the drawing size.

Figure 10:
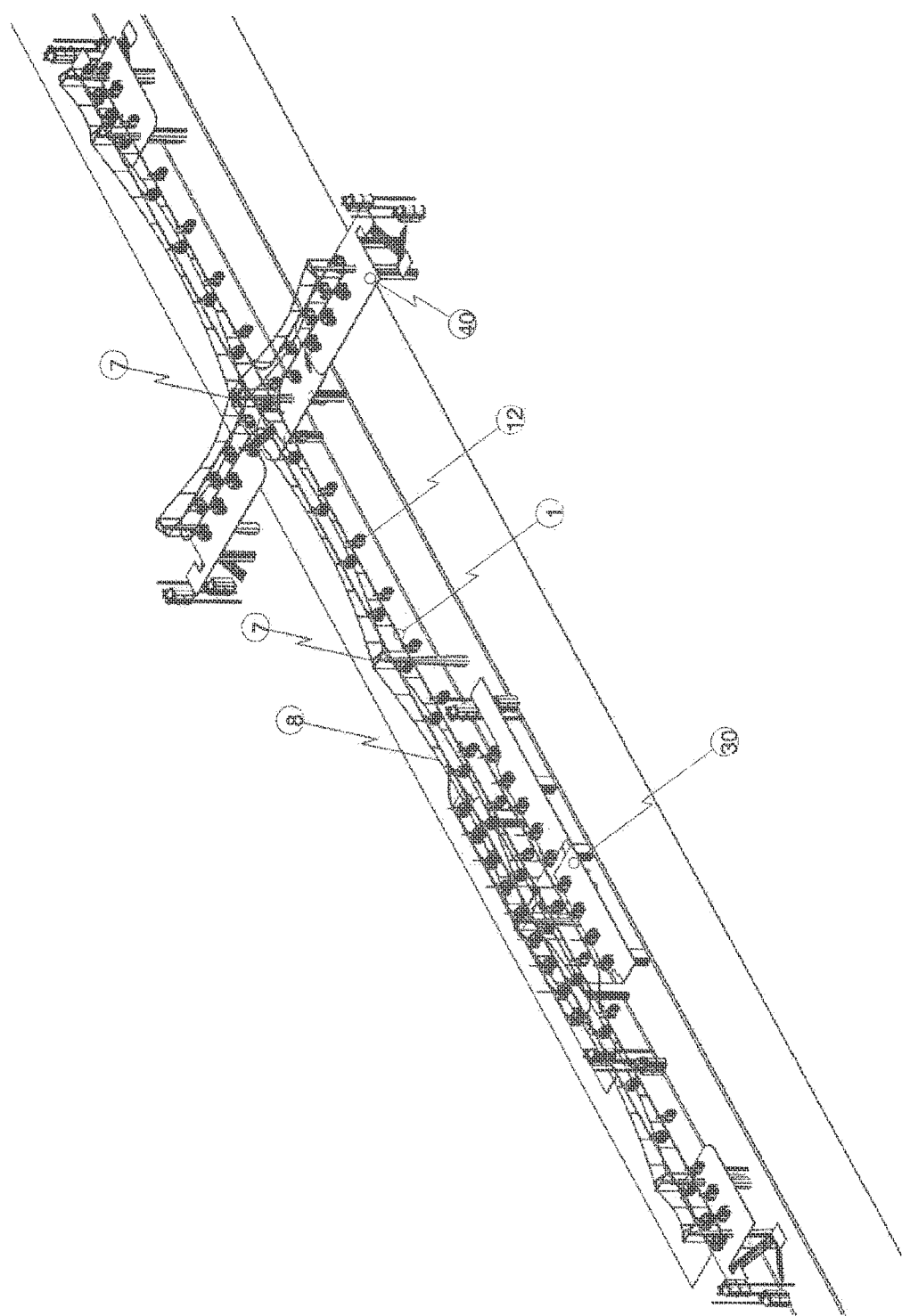

FIG. 10 shows an isometric view of a TUEP in its alternative embodiment, with terminal stations and two intermediate stations. The straight lengths of the route section are not shown due to the drawing size.

Figure 11:
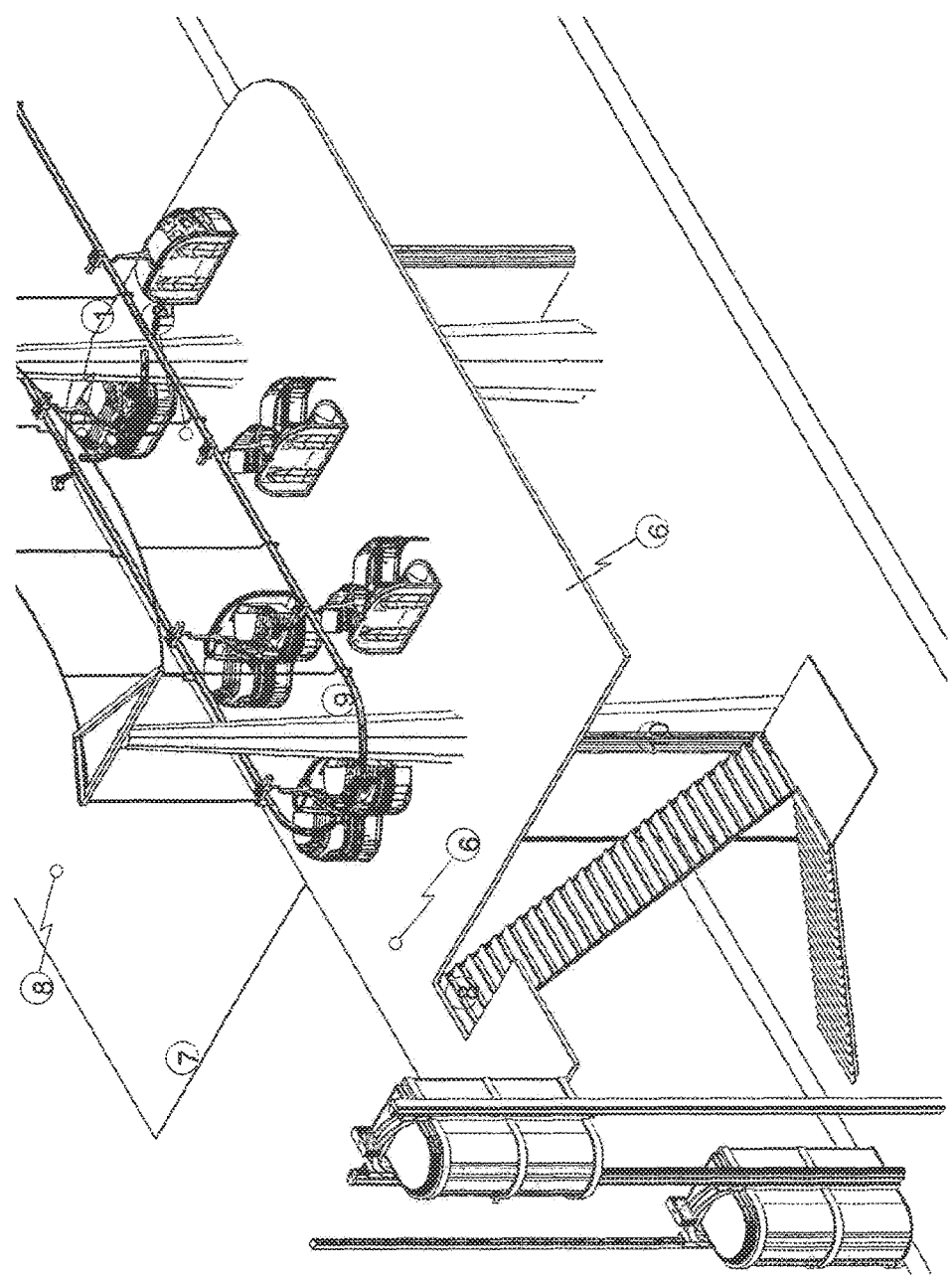

FIG. 11 shows the isometric arrangement of a terminal station of the alternative embodiment.

Figure 12:
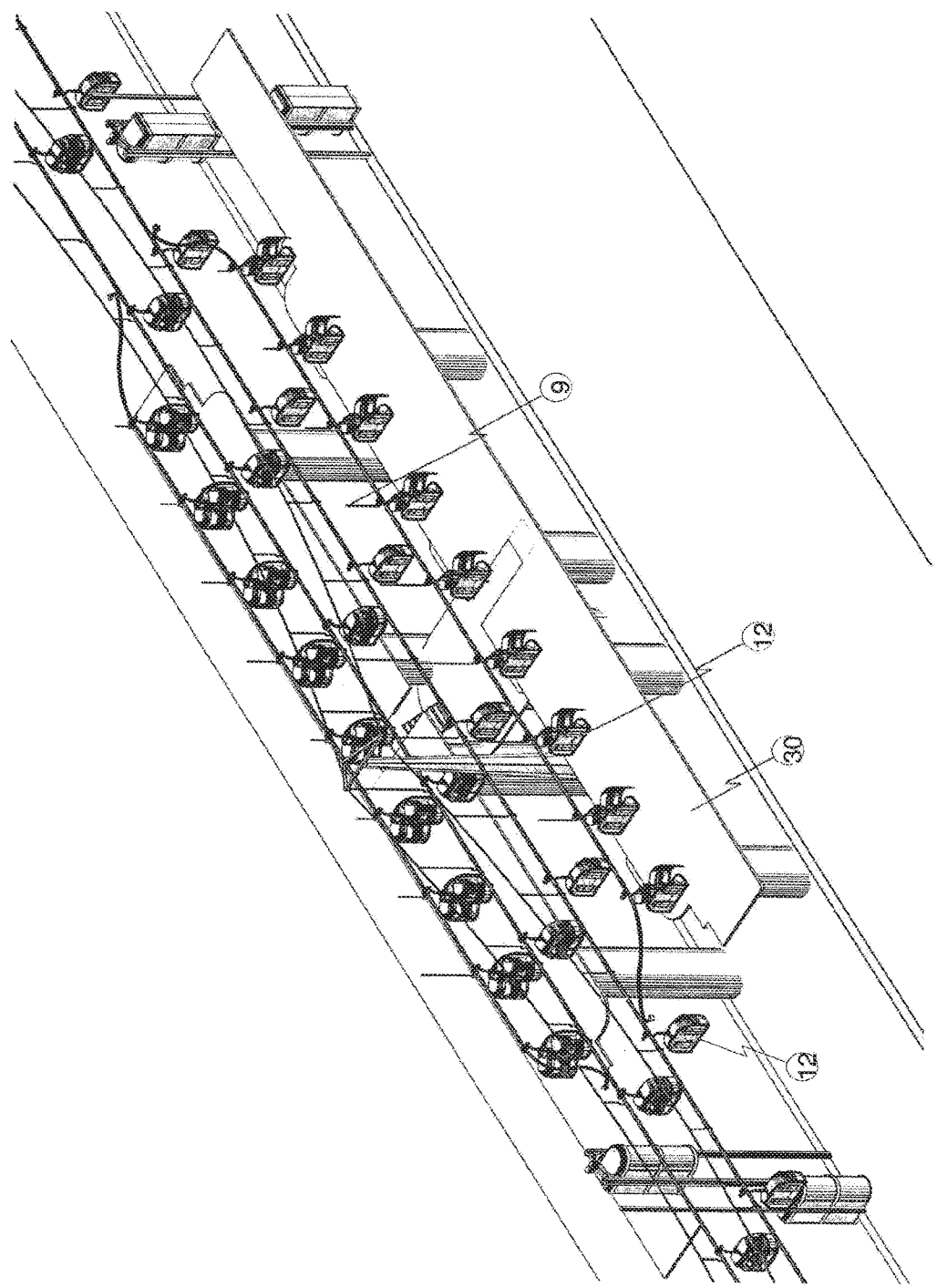

FIG. 12 shows the isometric arrangement of a longitudinal Intermediate Station of the alternative embodiment.

Figure 13:
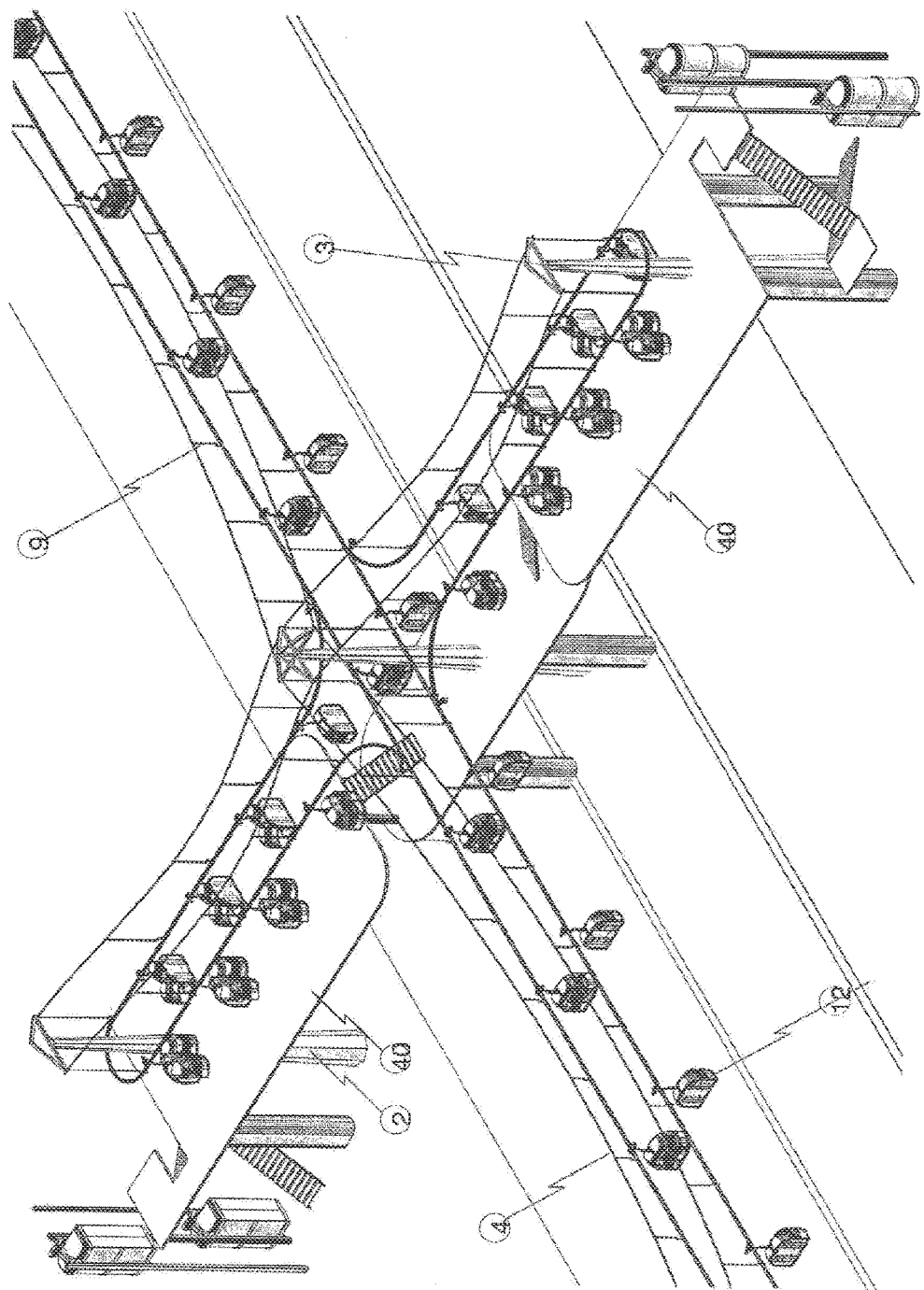

FIG. 13 shows the isometric arrangement of transverse intermediate Station of the alternative embodiment.

Figure 14:
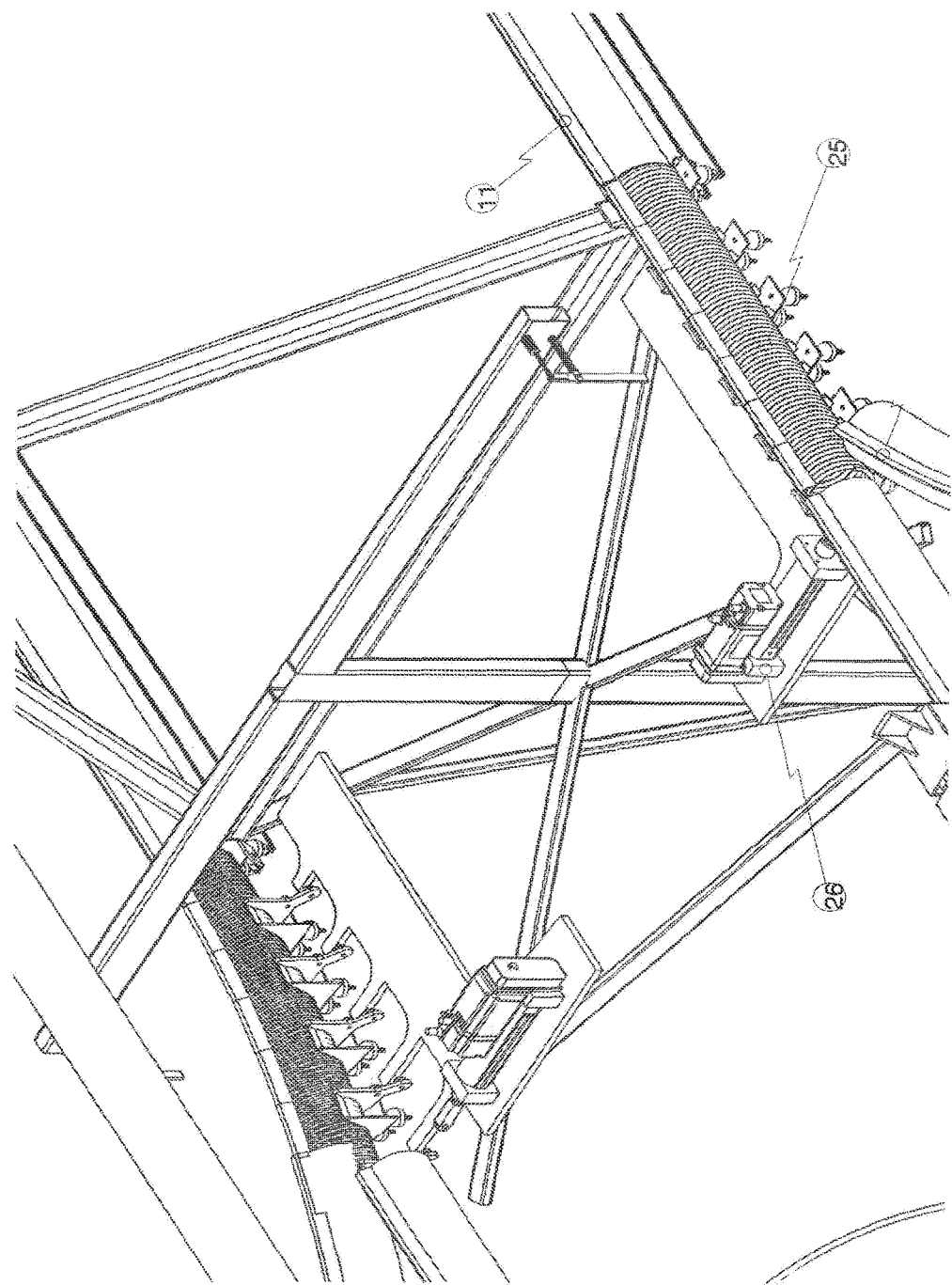

FIG. 14 shows the diverter in upright position with lower bearings.

Figure 15:
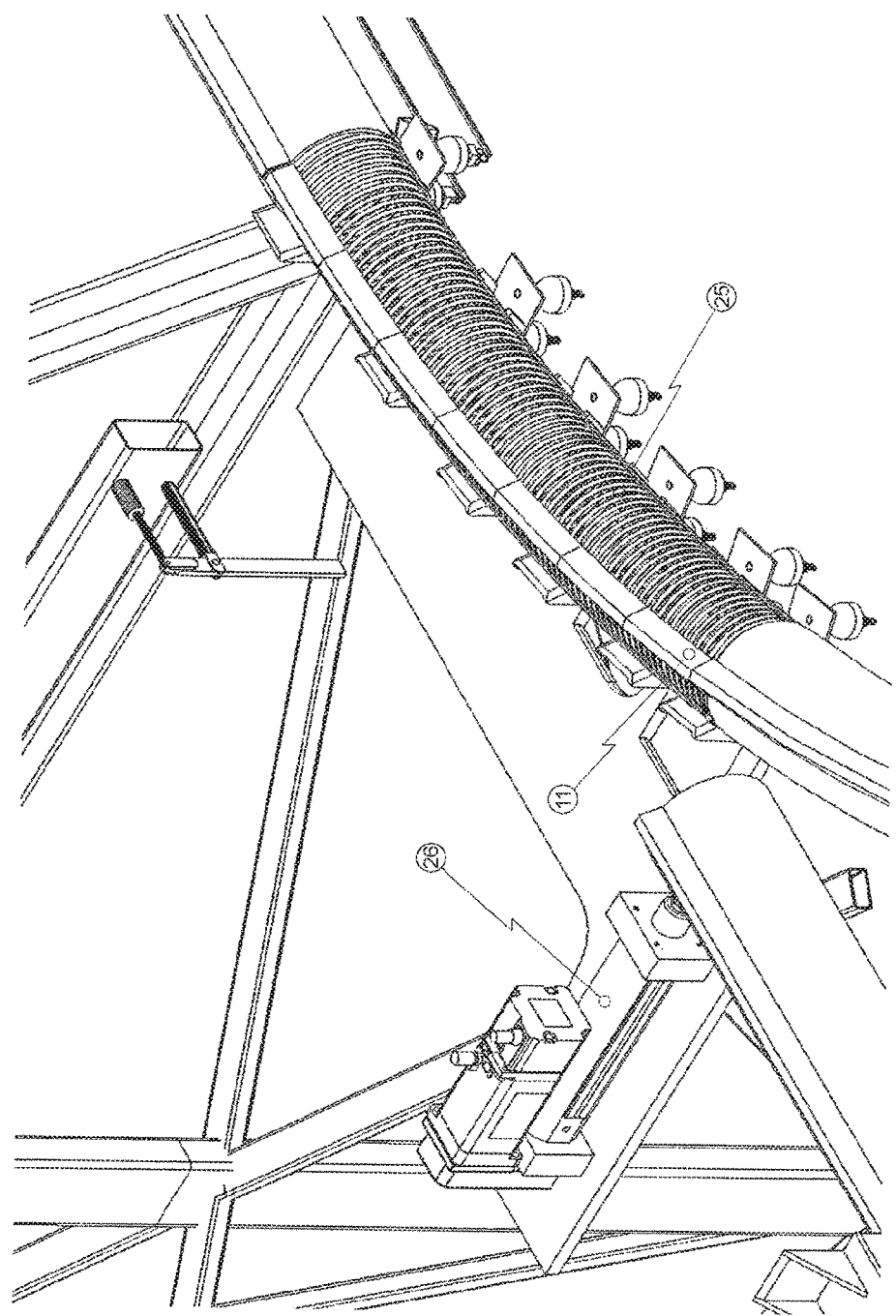

FIG. 15 shows the cabin diverter in a curved position towards the stations.

Figure 16:
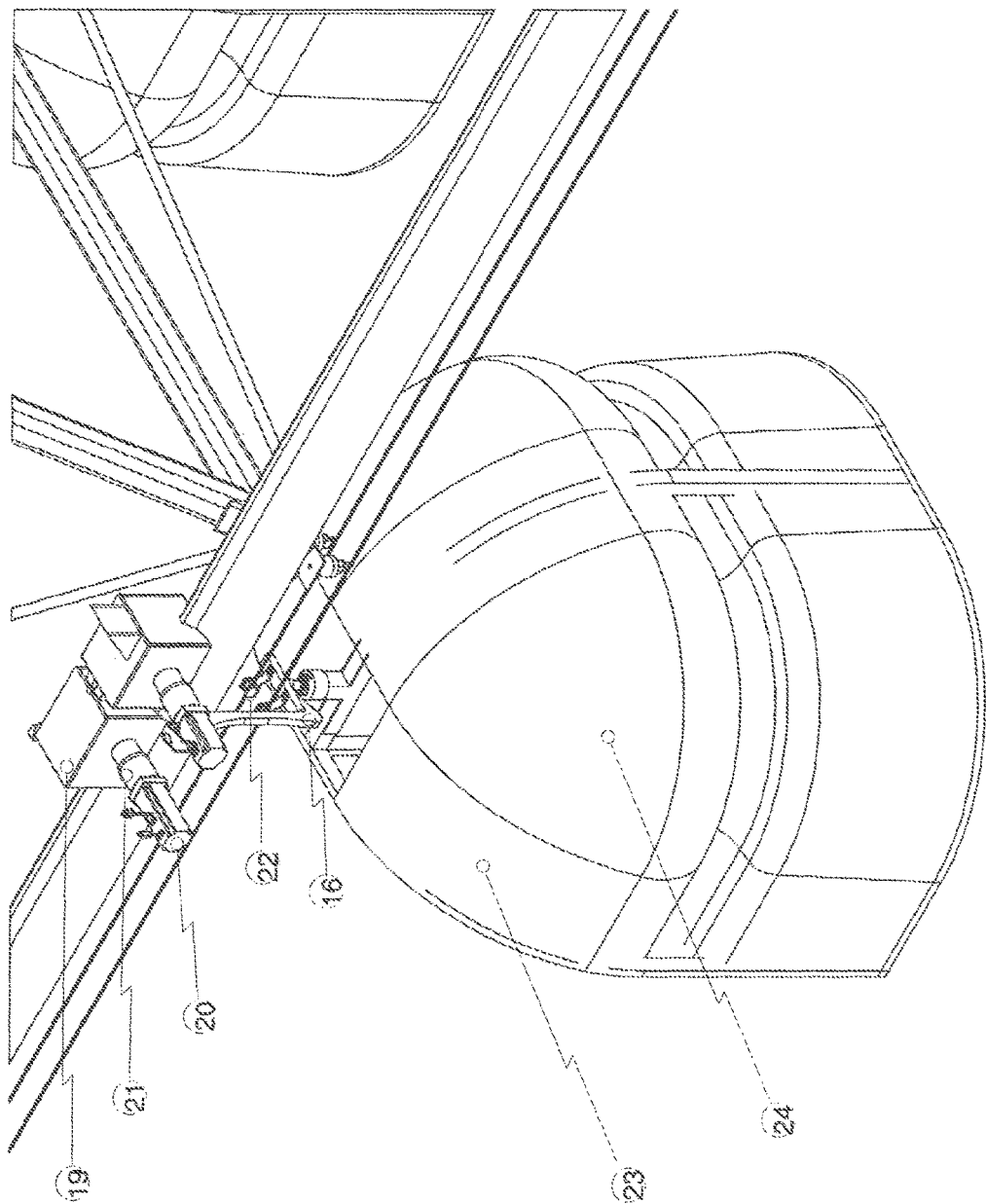

FIG. 16 shows the passenger cabin with its driving system.

Figure 17:
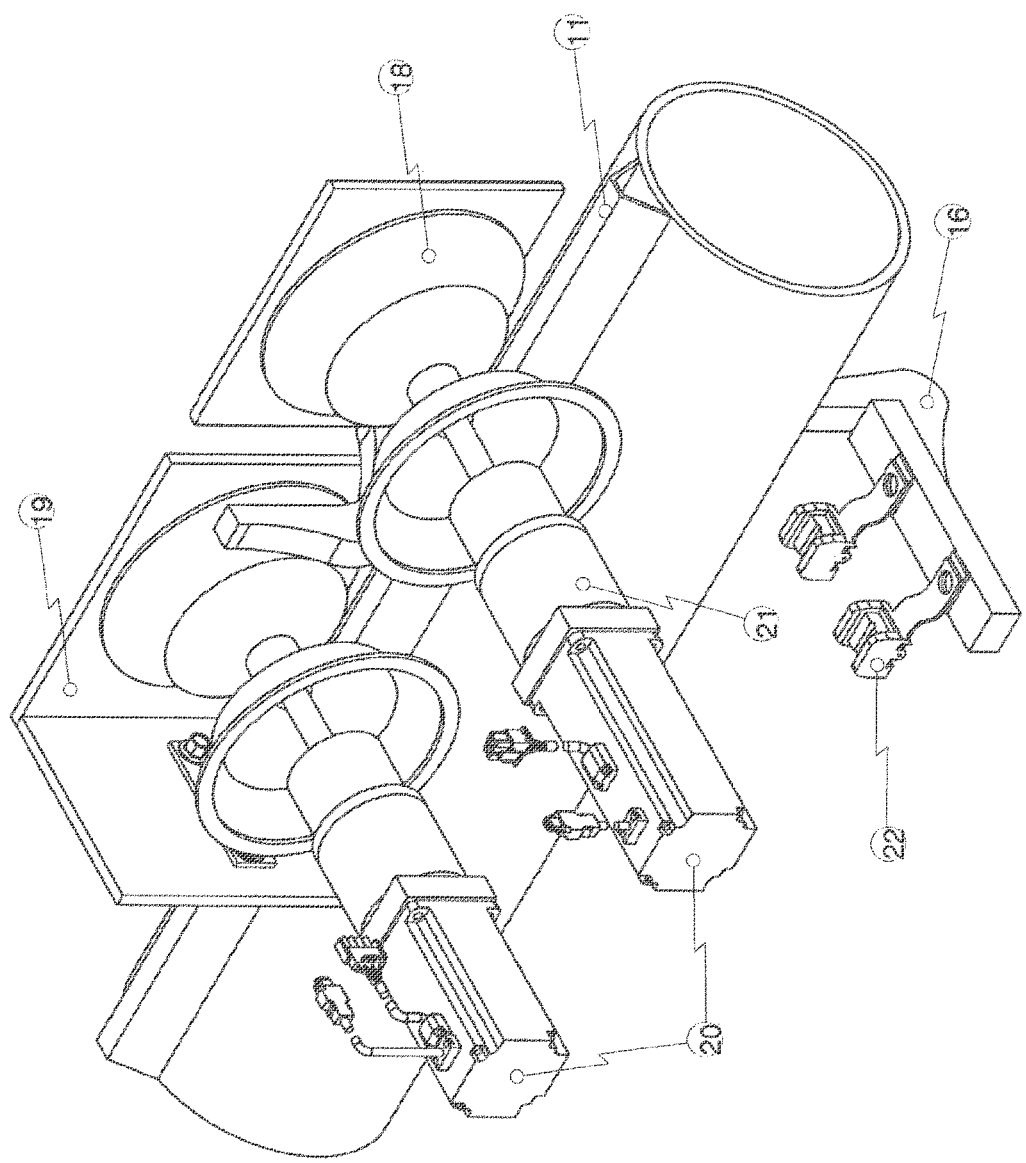

FIG. 17 shows the inside of cabin driving system.

Figure 18:
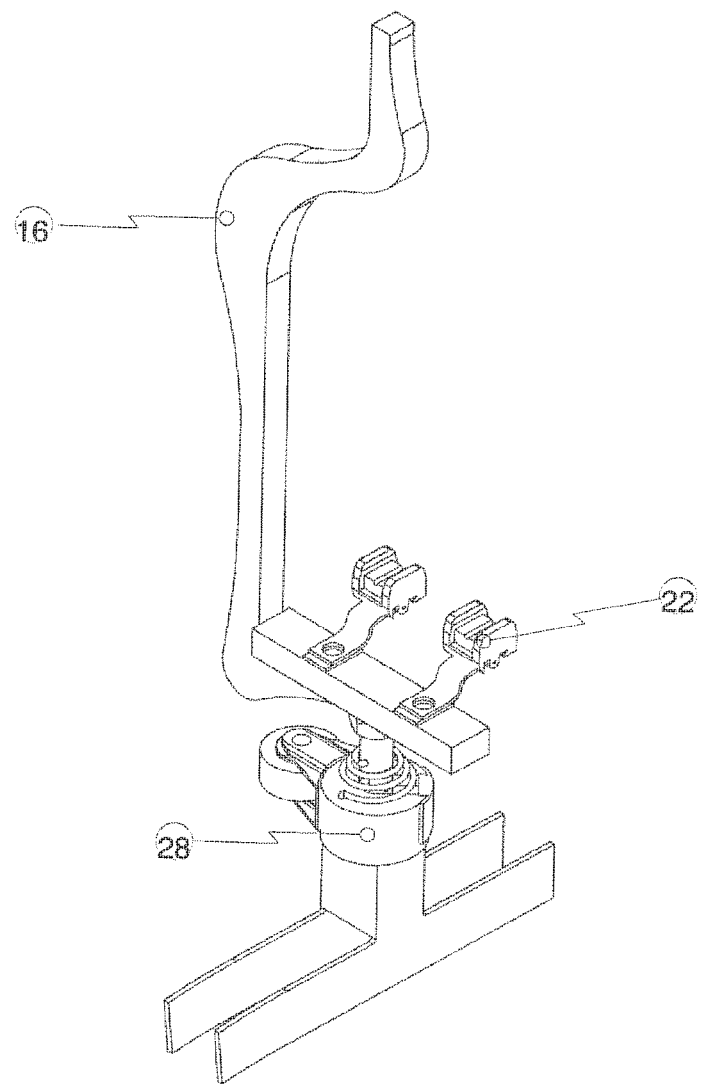

FIG. 18 shows the hanging hook of the drive system towards the cabins with 90° turn swivel for the stations.

Figure 19:
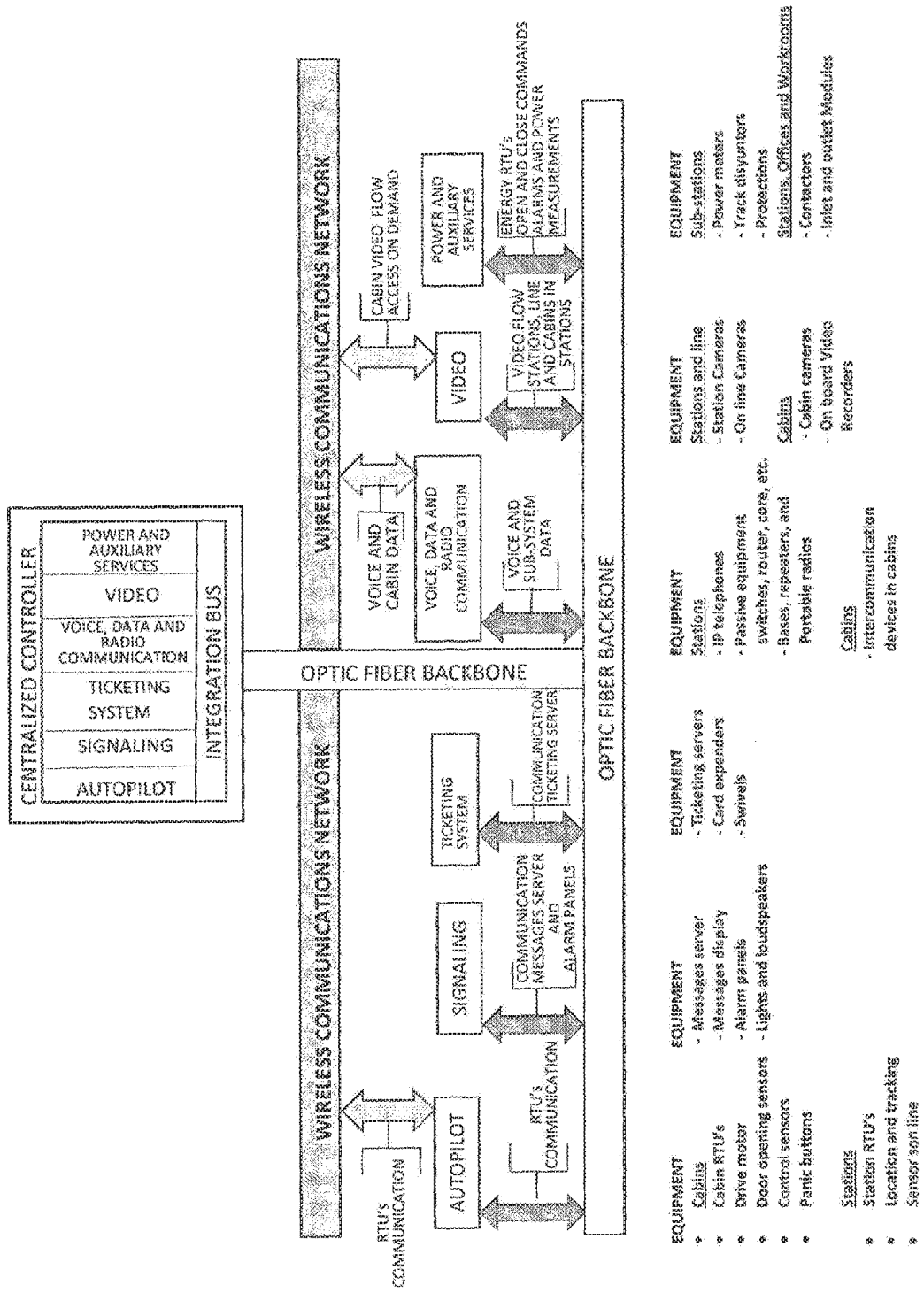

FIG. 19 shows the block diagram of the architecture of the system for automation and control of the entire transport system.

DETAILED DESCRIPTION OF THE INVENTION

Figure 1:
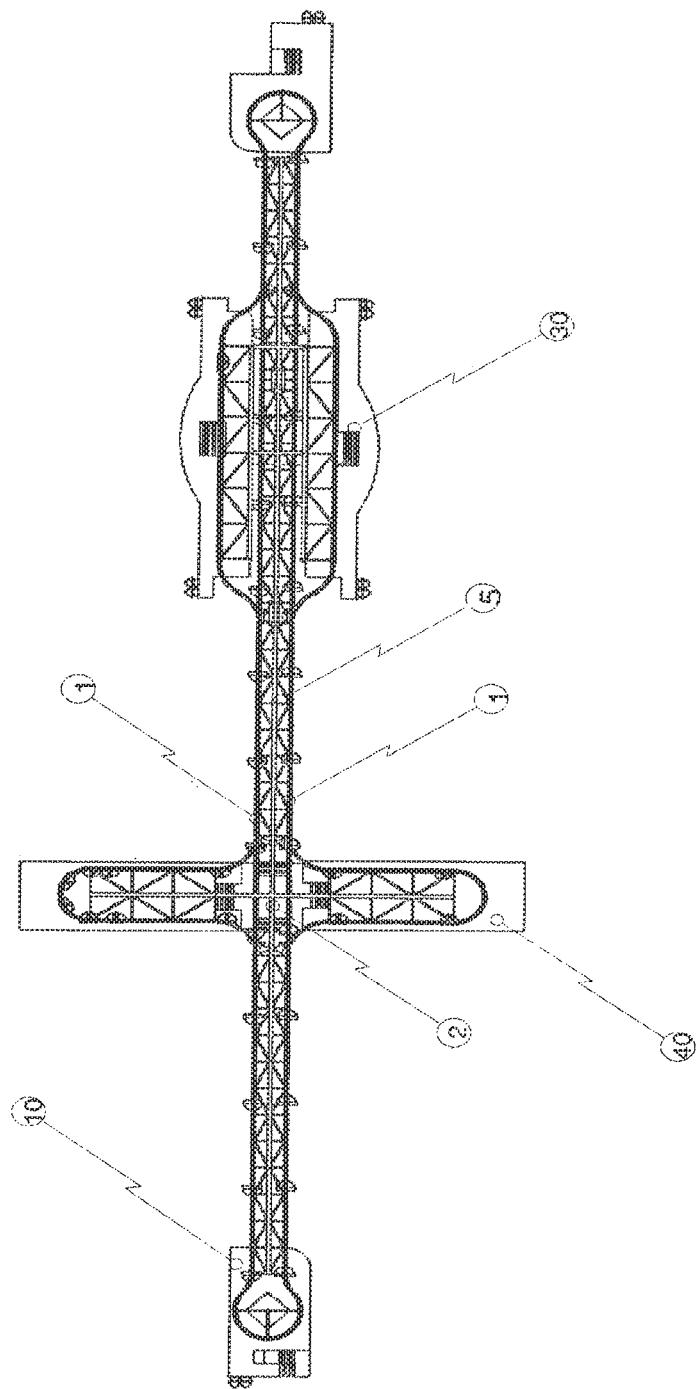
FIG. 1 shows a plan view a TUEP in its preferred embodiment, the Terminal Stations and two Intermediate Stations. The straight lengths of the route section are not shown due to the drawing size.
Figure 2:
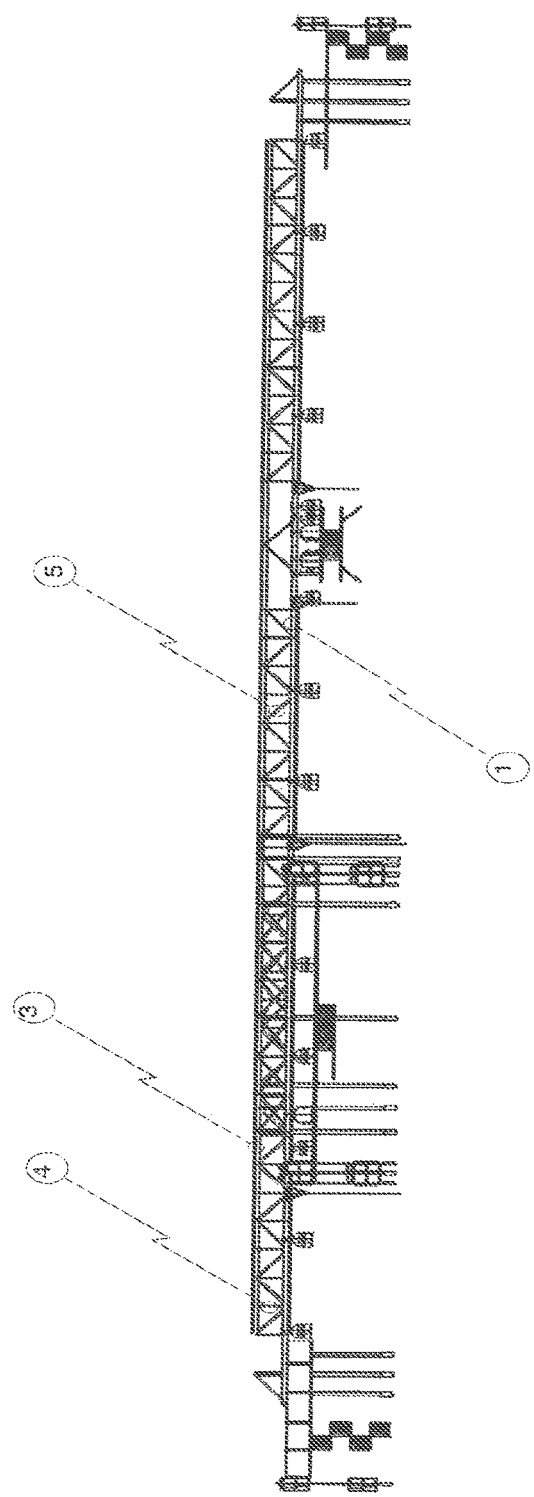
FIG. 2 shows the elevation view of a TUEP in the preferred embodiment, with the Terminal Stations and two Intermediate Stations. The straight lengths of the route section are not shown due to the drawing size.
Figure 3:
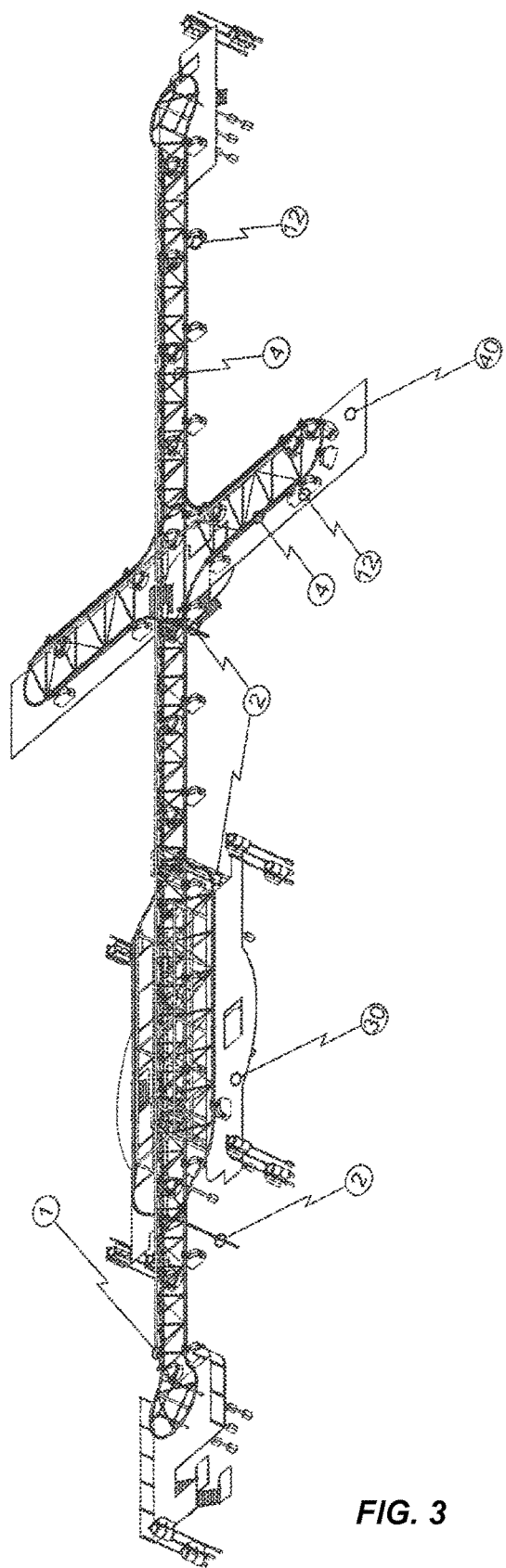
FIG. 3 shows the isometric view of a TUEP in the preferred embodiment, with the Terminal Stations and two Intermediate Stations. The straight lengths of the route section are not Shown due to the drawing size.
Figure 4:
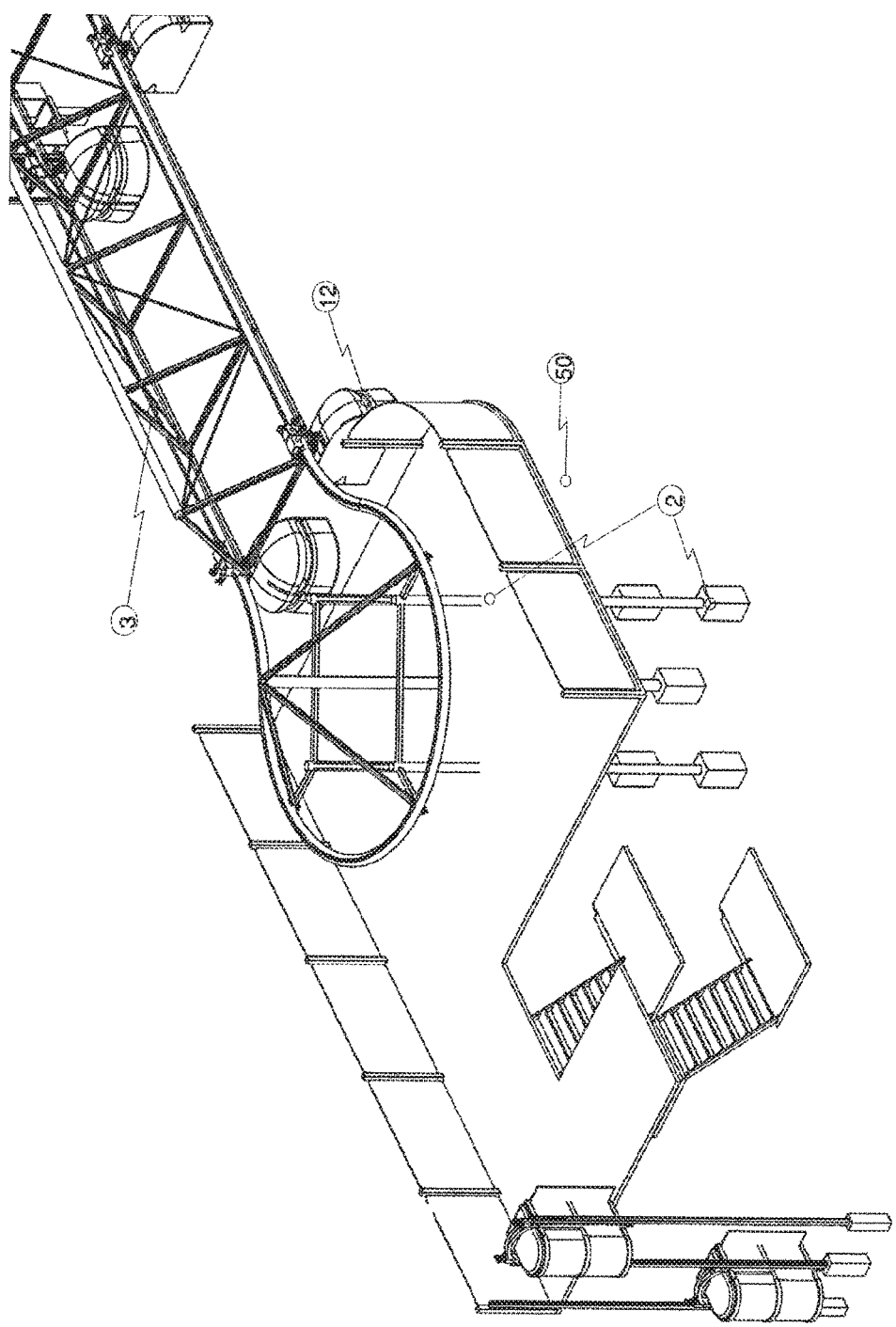
FIG. 4 shows the isometric arrangement of a terminal station.
Figure 5:
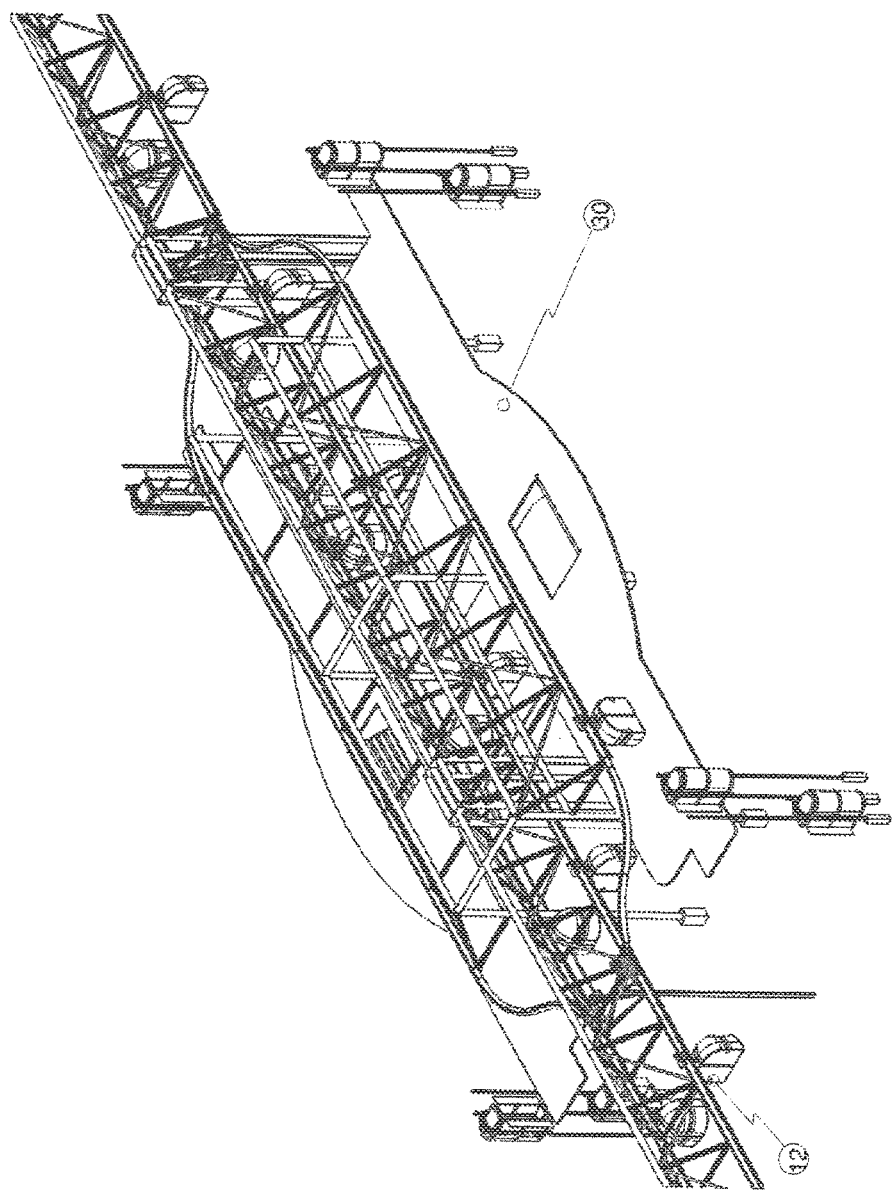
FIG. 5 shows the isometric arrangement of a longitudinal Intermediate Station.
Figure 6:
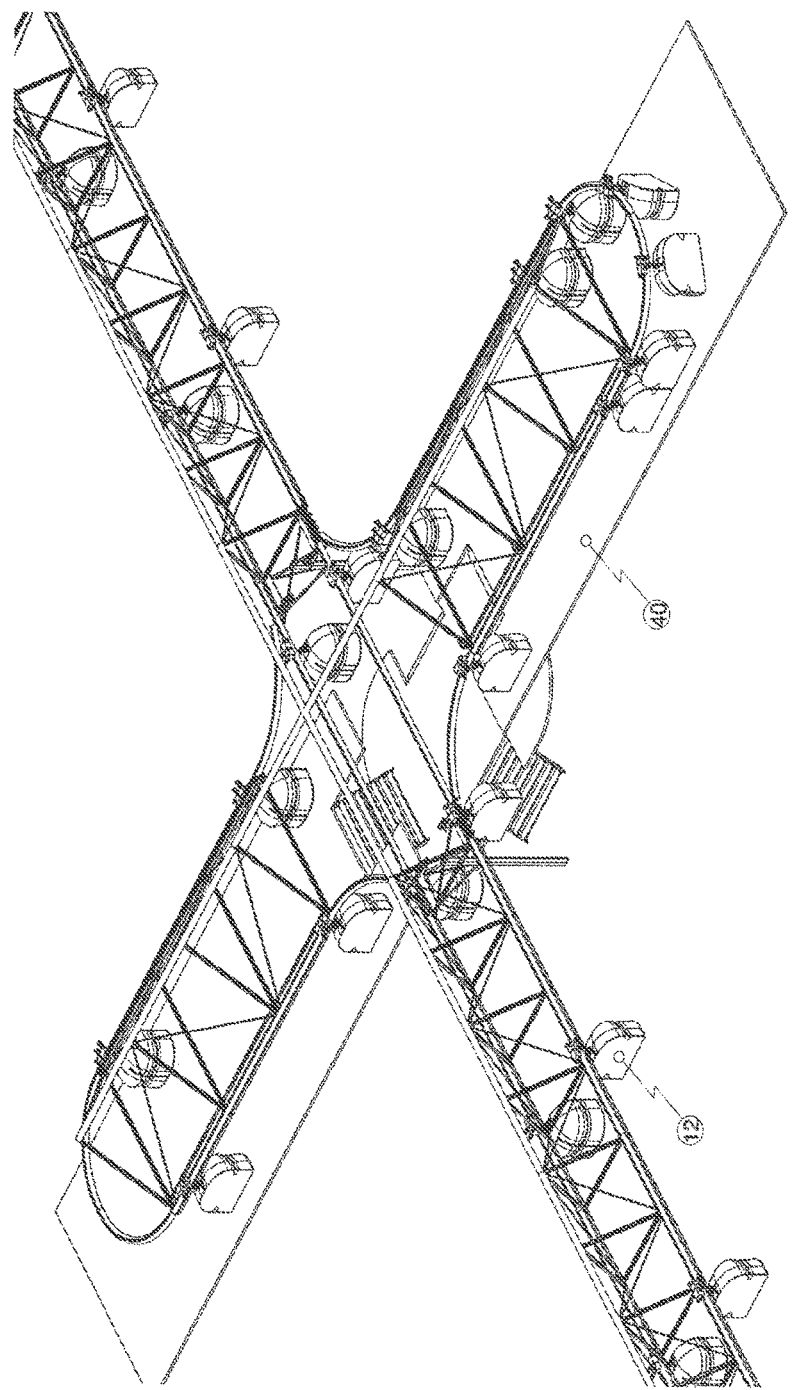
FIG. 6 shows the isometric arrangement of a transverse Intermediate Station.
Figure 7:
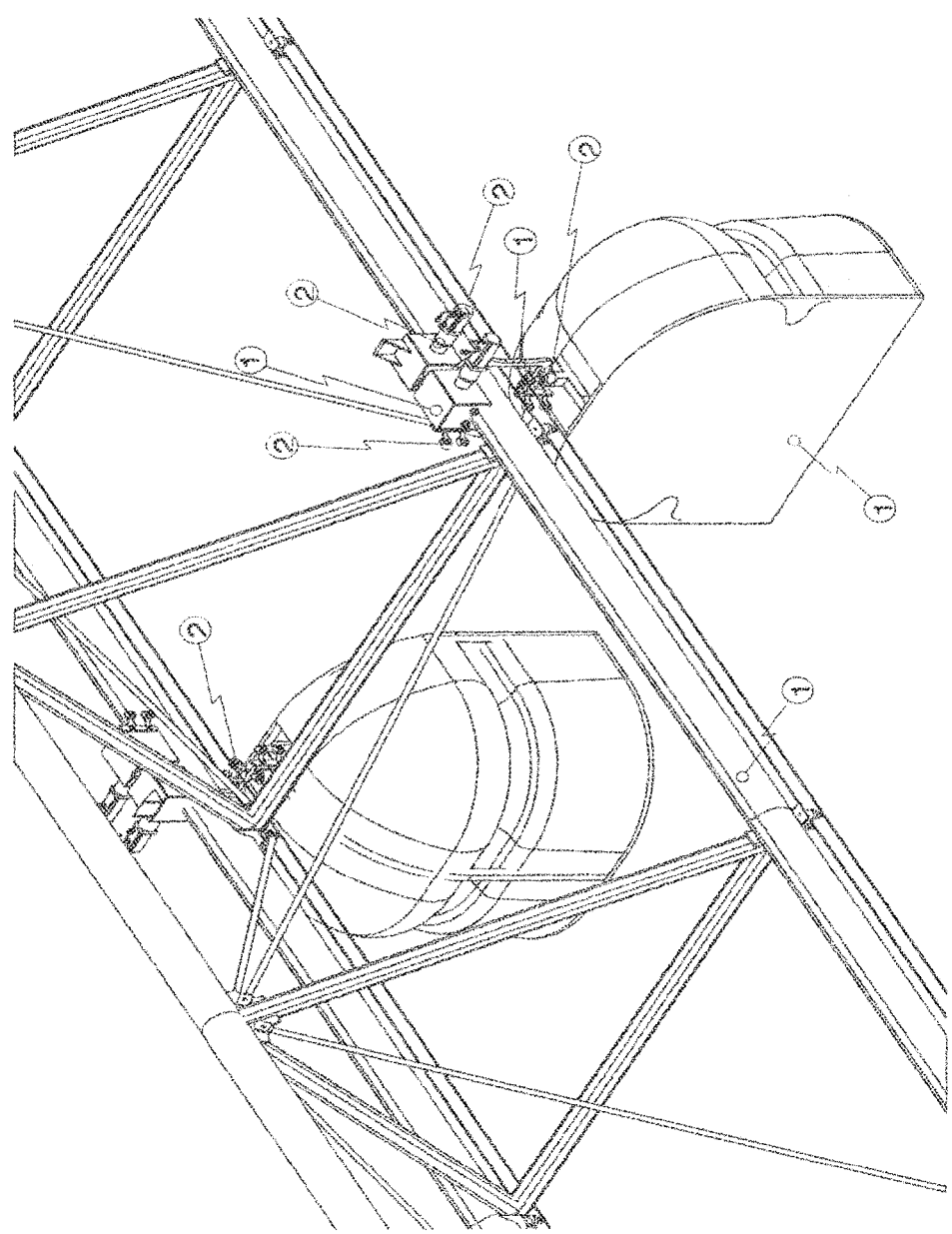
FIG. 7 shows a close-up of the cabin integration.

With reference to the accompanying figures and in particular to FIGS. 1, 2 and 3, the TUEP of the present invention comprises an overhead urban transport system formed by a double traffic longitudinal track (1), which is high above the streets of cities. The tubular track is suspended by a series of poles (2), which are firmly planted on urban ground through their reinforced concrete foundations (not shown). We have considered two different ways of supporting the elevated tubular track, according to the needs of the case due to gaps to be bridged, the height of the track and other seismic, wind or snow considerations.

The preferred embodiment is composed of a composite structural frame, made up by the support columns, the tubular track itself in both directions, a third longitudinal tube (3) parallel to the tubular track; square tube studs (4) forming an isosceles or equilateral triangle with the above-mentioned tubes and diagonal braces (5) to provide greater rigidity to the system. Similarly, the structure at the passenger stations is made up of tubular elements which form a triangular composite section.

The other way of supporting the tubular tracks is as follows: referring to FIGS. 8, 9, 10, 11, 12, and 13, on top of the pole (6) is positioned a metal structure (7) which serves to support the static cables (8), one in each direction of the TUEP through suspension, clamps as those used in power transmission lines (not shown). The static cables (8) by their own weight form a catenary of a variable height according to the tension with which they are installed, for which retention anchors are installed in the initial and final terminal and some intermediate stations, according to the needs of the TUEP line length. The material of the static cables is twisted steel wire which has high capacity, having to select the type of steel according to weather conditions. Spaced at each determined distance are firmly hung metal hooks (9) of variable length and which hang vertically to hold the tubular track (1) in their lower part, so that it is completely horizontally leveled or having the inclination planned by the topographic slope of the TUEP. The metal hooks (9) support and fit their lower end portion on the bottom wall of the tubular track (1), so that it does not move or detach. Between the vertical hooks on both sides of the TUEP there are X-shaped crossed bracings, which serve to provide stability to the system in the event of winds which tend to move the cabins in a pendulum.

FIG. 10 shows the tubular track (1) which is characterized in the alternative embodiment by being of tubular type, and with a diameter, thickness and material to ensure that it will not form a catenary by its own weight and that of the loaded cabins. At the top of the tubular track a stabilizer bar (11) is attached, which may be triangular, rectangular or shaped as a rail, so that upon a lateral thrust of the cabin by wind or lack of balance of the live load, the position of the cabins and its traction pulleys is not tilted. The latter should have at the bottom thereof a similar slot that necessarily engages the stabilizer bar (11).

The passenger cabins (12) as a whole, shown in FIGS. 1, 3, 4, 5, 6, 7, 8, 9, 10, 11, 12, 13 are basically comprised of three sections: the drive section consisting of pulleys and metal frame (18) and (19), motors and reducers (20) and (21), (16) and (28), and hanging support section (16) and

(28) for the passenger receptacle section (23). The drive section comprises one or two metal pulleys (18) which roll on the back of the tubular track and have the same inner diameter as the track tube diameter, but which is also coated inside with rubber or a replaceable elastomer, to provide sufficient friction between the pulley and the tubular track so that it does not roll and slide thereon. The drive pulleys (18) are supported at their ends by antifriction bearings and a metal frame (19) holding the same. One or two traction pulleys can be used in each cabin, with their respective motors (20) and gears (21), in order to provide greater stability to the cabins, as well as increased traction while giving greater security to the entire system should any electric motor failed, whereby the other in case of emergency can take the cabin to the next station, where it should be removed from the system and the passengers rescued therefrom. From this metal frame is firmly screwed the hanging support of the cabin (16) which descends vertically to the structure thereof. The mounting flange of the electric motors (20) is also supported from the metal frame (19). The rotor shaft of the motors is directly coupled to the drive pulley (18) or through a speed reducer, as needed. The motor provides movement to the pulley and the same in turn provides displacement of the cabins in the TUEP. Electric motors (20) may be DC preferably brushless or AC variable speed. The power supply to the motors is accomplished by trolleys (22) that make sliding contact with the catenary of the electrical cables connected to the electrical substations or battery of the system. The hanging support (16) of the cabin ends in its lower part with the metallic structure of the receptacle (23) supporting the rear wall, the floor platform and the passenger seats. Said hanging support has a hinge (28) at its bottom which allows rotation of the cabin 90° when they reach the stations, by being channeled by a rail. The front portion of the cabin (23) is hinged to the front and is intended to serve as doors (24) giving access into the same by a system assisted by hinges and locks like those used in automotive vehicles for side doors. Said doors are opened automatically by a ratchet lever mechanism that upon reaching the appropriate area of the stations causes the doors open to the front. Other similar mechanism but in the opposite direction causes the doors to close on exit areas of passenger stations. The cabins are also equipped with locks similar to those used in motor vehicles and have proximity sensors or micro switches to disallow engine actuation if the cabin is not fully closed. The cabins can not be opened from the inside as a safety factor. Inside the cabins are appropriately placed the buttons in which a descent destination is set, which is transmitted to an outer emitting antenna for the positioning system. An alternative is that the destinations of the cabins are scheduled by a dispatcher at each station, which through an RFID (radio frequency) system achieves the same object as the command buttons.

A specific feature of the TUEP are intermediate Passenger stations (30) and (40) shown in FIGS. 1, 3, 4, 5, 6, 7, 8,9, 10, 12 and 13 which are made up of escapes or sidings of the elevated tubular track and aim to not disrupt traffic of cabins that are not headed to that destination as station, only those cabins that need to leave or take passengers on that specific station being diverted. Therefore a tubular Parallel way or perpendicular escape make up the stations in which the tubular track allows the downturn, stopping, accumulation, acceleration and incorporation of the cabins to the TUEP main track. This is achieved by tubular diverters (25) shown in FIGS. 14 and 15 at the entrance and exit of the stations, which by electric or hydraulic or pneumatic actuators (26), change the course of the tubular track for continuing or not with the tubular track of the stations. The diverters (25) themselves are flexible tubes that may be bent through a lateral force changing the path of the tubular track. The preferred embodiment for these diverters, without this be the only one is the use of springs the outer diameter of which is exactly that of the tubular track and which turns allow elasticity and at the same time stiffness to serve as tubular track. The material can be steel or any metal or reinforced plastic that provides these characteristics. To avoid vertical deflection of the diverters, inner hinge mechanisms (not shown) or bearings on plate are installed as shown in FIGS. 14 and 15. The operation of the diverters is by actuators (26) as mentioned above which after receiving or sensing the source emission from the antennas on the circulating cabins, pull in accurately and quickly the diverters before the particular cabin circulates through them. Once passed the cabin, the diverter returns to its upright position through its actuator, in order to give continuity to the main tubular track. A similar but reverse operation occurs with the diverters incorporating the station cabins to the main tubular track; only that the actuators operate when detect a empty space between two cabins left by a cabin that left to some station and is there where a cabin can be inserted to the main flow of the TUEP. To achieve this, information in real-time from the system's positioning system is essential.

In the unlikely event that an actuator (26) does not position the diverter (25), and avoid a safety conflict for the cabins, a system has devised to stop them by a hydraulic damper (27) equipped with a lever mechanism which would be depressed by an impact plate placed in the pulley box (19) of the drive part of the cabin. The actuation of this damper shall electrically stop all the cabins to avoid impact between them.

On the platform of the stations there are cabin floor leveling guides, as well as a braking system so that when passengers get off or board the cabin, it remains in a stable position for a few seconds to avoid accidents and inconvenience to users. These guides in turn provide the power supply to the cabins in the station area, which is different from that of the main line.

By being overhead, the stations need passenger escalators and elevators to achieve user access to them, so they are an integral part thereof. We have designed two types of intermediate stations shown in FIGS. 5 and 6 and two terminal stations (50), shown in FIG. 4, without being limiting in conception, as it will depend on the specifics of each case TUEP. Longitudinal intermediate stations (30) shown in FIG. 5, have arrangements of sidings in Parallel to the main tubular track, using the same road divider where the TUEP is installed. Transverse intermediate stations, shown in FIG. 6, have a siding perpendicular to the main tubular track of the TUEP and serve to allow the vehicular traffic to pass beneath them, having user access thereto on the sidewalks of urban streets or avenues where the TUEP is installed.

All passenger stations shall have an empty cabin accumulation zone, which aims to remove from circulation those that due to the low passenger demand are unnecessary in the line and thus to avoid unnecessary power consumption and excessive wear and tear, as well as providing maintenance.

The electrical system is characterized by being equipped with substations, emergency plants, direct current distribution system, trolley system along the line, variable speed electric motors and speed and torque controllers of the "Drives" kind.

Regarding the automation system, we have included a sophisticated system in order to give greater security and functionality to the entire complex. FIG. 19 shows the architecture of the control system. To meet the needs of the TUEP, the Automatic Steering System is designed to operate in two modes: 1) Remote-Auto mode and 2) Local Mode;

1. the remote-automatic mode is dedicated to run automated routines for monitoring origin-destination routes of all gondolas along the line; this is done remotely from the Command Center of the TUEP, thus using fiber optic and wireless networks for communication with Remote Terminal Units (RTUs) where the arrivals and departures of gondolas and stations are controlled.

2. The local operation mode is designed to operate under a failure of the network, application server or remote automated programs of the Command Center. This mode of operation is based on the Remote Terminal Units (RTU) installed in each gondola and at each station. The RTUs of the gondolas have a processor with the ability to control the speed, distance, starting and get off request commands of users. The RTUs of the stations also have at least one processor, are capable of controlling the line diverters and movement of the cabins at each station. In local mode, monitoring and remote control would not be featured.

1. The following equipment is present in the Command Center:
  i. Application and Data Server.
  ii. Operation Station and Peripherals.
  iii. Network Equipment.

2. In the Application and Data Server reside programs and routines for origin-destination route control, real-time Cabin databases and data for each trip, per station and cabin. Graphic monitoring software is installed in the Operation Station, where alarms, trends and reports are displayed, and which is the equipment where operators interact with the operations of the line.

3. The following equipment is installed in the cabins:
  Remote Terminal Units (RTU) with power supply, processor and input and output modules.
  Sensors for commands and motor control.
  Distance sensors.
  Start buttons.
  Panic buttons.

4. At the stations there are installed:
  Remote Terminal Units (RTU) with power supply, processor and input and output modules.
  Sensors for commands and motor control.
  Distance sensors.
  Station selection buttons.
  Panic buttons.

Mode of Operation

Once passengers access an overhead station using the escalators and elevators, accumulation of passengers is not necessary as in the traditional transport stations, since the flow of cabins is continuous and only requires a few seconds for a cabin to reach that destination or an empty cabin no having a previously requested particular destination is called. Therefore, the space of the platforms at the stations may be limited. Once the cabin arrives to the station, the hinged doors open the same allowing access for a few seconds to passengers to be accommodated and seated. Once this happens, either manually or automatically the cabin will start a small advancing movement causing the actuator mechanisms to close the hinged doors thus being positively locked in order for proximity sensors or contact points to indicate the cabin engine control that it can continue the journey and so enter the flow of the main tubular track.

Once the hinged doors are closed, passengers must press the button of the destination they want to travel or the manual boarding assistant will schedule a particular destination for that cabin. Only a maximum of two destinations may be selected per cabin depending on the number of passengers. That is, in each trip only one interruption may exist as a maximum of the time required for transfer. Once a destination is met the control system erases the memory of the cabin thereof, a next one thus being available. When having traveled the cabin arrives at a destination by operating the diverters, the cabin suffers an adequate deceleration, turns 90° on its hanging support and automatic opening of the hinged doors is made, up to the reaching the braking zone where the cabin stops for a few seconds to allow the descent. Subsequently the open cabin slowly moves forward until the passenger boarding area where it stops again for a few seconds and the previously described sequence begins. The passengers that left the cabin must go down the escalator or elevator to street level.

The positioning control system of each station has the local capacity of the next cabins and therein the total master control of the TUEP contains all the controls for all stations.

During the hours where passenger traffic is reduced, it is not necessary that the empty cabins are in circulation, so some of these must be removed from the main flow during the time when demand is reduced, so some or all stations shall have a storage system for cabins leaving temporary circulation, either manually or automatically, and then to return to the main flow when the demand requires that they are integrated to the TUEP system.

It is noted that with regard to this date, the best method known to the applicant for implementing the cited invention is the one clear from the present disclosure of the invention.

Having described the invention as above, it is claimed as property what is contained in the following claims:

1. An overhead urban transport system for passengers including a plurality of autonomous passenger cabins (12) transported on tubes, comprising:
  an infrastructure, comprising:
    two horizontal or inclined parallel tubes forming part of a composite tubular structure with a triangular cross section;
    a parallel third upper tube, the tubes being connected together by tube studs (4) and diagonal braces (5), wherein the composite structure is supported by poles (2) at predetermined distances, and wherein the poles are topped by a triangular structure which (7) supporting static steel cables (8);
    hooks (9) configured to vertically hang and hold tubular tracks (1) on which a plurality of autonomous passenger cabins (12) move, wherein the tubular tracks (1) are supported by the hooks (9) at the bottom so that the opposite side of the tracks are free for the movement of the cabins; and
    diverters (25) that are part of the tubular tracks (1) and are horizontally flexible such that they deflect the track to the stations and deflect from the stations to the main track through operation of actuators (26) upon request of a control system;
  passenger stations, both terminal (50) and intermediate (30, 40), configured to provide means by which users can access the overhead transport system;
  passenger cabins (12), comprising:
    swivel front doors or a front liftgate; and
    a structural pendant connecting them from a metal frame of the cabins reinforcement with the case of a traction pulley (18) which runs on top of the tubular tracks (1) of the infrastructure, wherein inside said case are placed the traction sheaves that are coupled to electric motors (20) directly or by way of speed reducers (21) which receive power supply by means of trolleys (22) contacting through electrical brushes bare wires running hanged from electrical insulators at the bottom of the track tubes, or batteries, and wherein the cabins are autonomous in terms of their traction and control means;

a system of energy supply by electric: substations, distributed over the transport line to feed through power cables the bare wires for the trolleys (22) of autonomous electric motors (20) of the cabins;

a cabin control and automation system containing the drivers of the servo controllers, programmable logic controller (PLC), a remote terminal unit (RTU), sensors and control buttons, which through wired and wireless signals and radio frequencies establish communication with the PLC of the passenger stations and these in turn with the PLC of the master control system, according to programming;

a sensor system on the tubular track and in each cabin, configured to detect the temporary destination set thereof, such that from the PLC of each station the operation signal is sent to the electric actuators of the track diverters (25), in order to bring said particular cabin to a station and vice versa via a second diverter, from the station back to the tubular track (1); and a master control system powered by a SCADA type data acquisition system, configured to know at all times and in real time the relative position of each cabin in relation to the entire system, to allow correction of distances between cabins, starts and stops, accelerations and decelerations of the engines, both on the main track and in the tubular stations.

2. The overhead urban transport system for passengers according to claim 1, wherein the cabin further comprises a drive pulley (18) and an electric motor (20).

3. The overhead urban transport system for passengers according to claim 1, wherein the stations include mechanisms (28) for rotating the cabins 90°, for routing the cabins to the stations by means of a rail, so that the cabins have a single front for passenger ascent and descent.

4. The overhead urban transport system for passengers according to claim 3, wherein the mechanism for rotating the cabins 90° consists of a ball placed at the bottom of the cabin hanging support.

5. The overhead urban transport system for passengers according to claim 1, wherein the tubular track (1) includes a stabilizer bar disposed at its top shoulder, the stabilizer configured to avoid imbalances in the cabin that may be caused by load, and wind; the stabilizer bar further configured to keep the passenger cabins (12) in a vertical position during their movement.

6. The overhead urban transport system for passengers according to claim 1, wherein the diverters (25) are operated by electric or hydraulic or pneumatic actuators (26) upon request of the control system.

7. The overhead urban transport system for passengers according to claim 1, wherein the cabins further comprise:
    an opening and closing system for either hinged or lifting doors;
    a command panel with buttons configured to temporarily set the destination; and
    a positioning control system which establishes communication with the control system of the stations for diverting the cabins at the destination stations, acceleration and deceleration, engine stop and start.

8. The overhead urban transport system for Passengers according to claim 1, wherein the power supply system also supplies power to the stations and control systems through distribution and protection boards.

9. The overhead urban transport system for passengers according to claim 1, wherein WiFi-like wireless signals are wired through a fiber optic cable included in the system.

10. The overhead urban transport system for passengers according to claim 1, wherein the master control and automation system acts to remove from circulation empty cabins that are not in demand during non rush hours, thereby avoiding unnecessary energy consumption and shortening the useful time of the components that make up the driving part of the cabins, or for maintenance.

11. The overhead urban transport system for passengers according to claim 1, wherein the master control system acts to reintegrate the cabins to the system when approaching rush hour and transport demand increases.

* * * * *

UNITED STATES PATENT AND TRADEMARK OFFICE
CERTIFICATE OF CORRECTION

PATENT NO. : 9,862,391 B2  
APPLICATION NO. : 14/897960  
DATED : January 9, 2018  
INVENTOR(S) : Luis Rodolfo Zamorano Morfin Page 1 of 1

It is certified that error appears in the above-identified patent and that said Letters Patent is hereby corrected as shown below:

In the Claims

In Column 10, Claim 1, between Lines 60 and 61 as a new paragraph, insert -- seats; --, therefor.

Signed and Sealed this
Eleventh Day of June, 2019

Andrei Iancu
*Director of the United States Patent and Trademark Office*